United States Patent [19]

Tsuzuki

[11] Patent Number: 5,373,930
[45] Date of Patent: Dec. 20, 1994

[54] PACKAGE TRANSPORT SYSTEM AND METHOD

[75] Inventor: Kiyohiro Tsuzuki, Greenville, S.C.
[73] Assignee: TNS Mills, Inc., Greenville, S.C.
[21] Appl. No.: 136,297
[22] Filed: Oct. 14, 1993
[51] Int. Cl.⁵ .............................................. B65G 47/24
[52] U.S. Cl. ..................................... 198/399; 198/448
[58] Field of Search ............... 198/398, 399, 405, 406, 198/448, 452, 560, 562, 563, 601, 417; 193/2 R, 2 D

[56] References Cited

U.S. PATENT DOCUMENTS

| | | | |
|---|---|---|---|
| 2,505,398 | 4/1950 | Harris | 198/399 |
| 2,529,603 | 11/1950 | Galt | 198/399 |
| 2,873,018 | 2/1959 | Dudley et al. | 198/399 X |
| 3,537,567 | 11/1970 | Nowicki | 198/399 |
| 3,706,368 | 12/1972 | Sterling | 198/399 X |
| 3,782,526 | 1/1974 | Simons | 198/399 X |
| 3,906,712 | 9/1975 | Miyazaki et al. | |
| 3,949,867 | 4/1976 | Kuiper | 198/560 X |
| 4,118,920 | 10/1978 | Miyazaki et al. | |
| 4,418,814 | 12/1983 | Rose | 198/406 |
| 4,495,230 | 1/1985 | Ellwein | |
| 4,979,360 | 12/1990 | Kallmann et al. | |
| 5,062,261 | 11/1991 | Fink | |

FOREIGN PATENT DOCUMENTS 0858330 12/1970 Canada ................................ 198/399

*Primary Examiner*—James R. Bidwell
*Attorney, Agent, or Firm*—Hardaway Law Firm

[57] ABSTRACT

A package transport system (1) is provided for transporting yarn packages from a textile machine (2) to a transport conveyor (4) and includes a first output conveyor (14) leading outwardly from a top portion of the textile machine, a second output conveyor (16) adjacent to the first output conveyor (14) also leading outwardly from the top portion of the textile machine, a first chute (18) communicating with the first output conveyor (14) for transporting a first package from an end of the first output conveyor (14) to the transport conveyor (4), and a second chute (20) communicating with the second output conveyor (16) for transporting a second package from an end of the second output conveyor (16) to the transport conveyor (4). The yarn packages are thus deposited onto the transport conveyor (4) at a predetermined distance from one another without making contact.

26 Claims, 7 Drawing Sheets

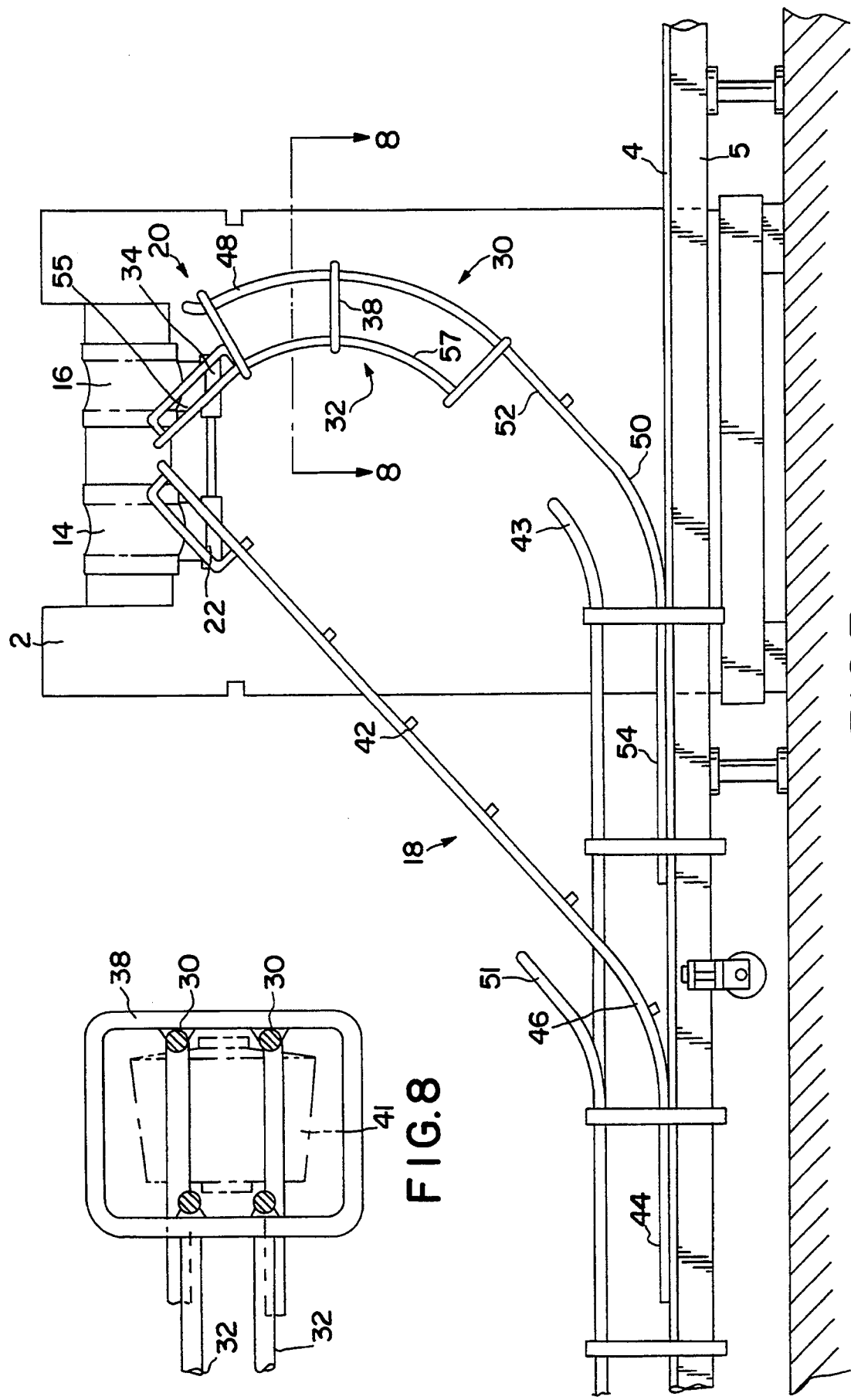

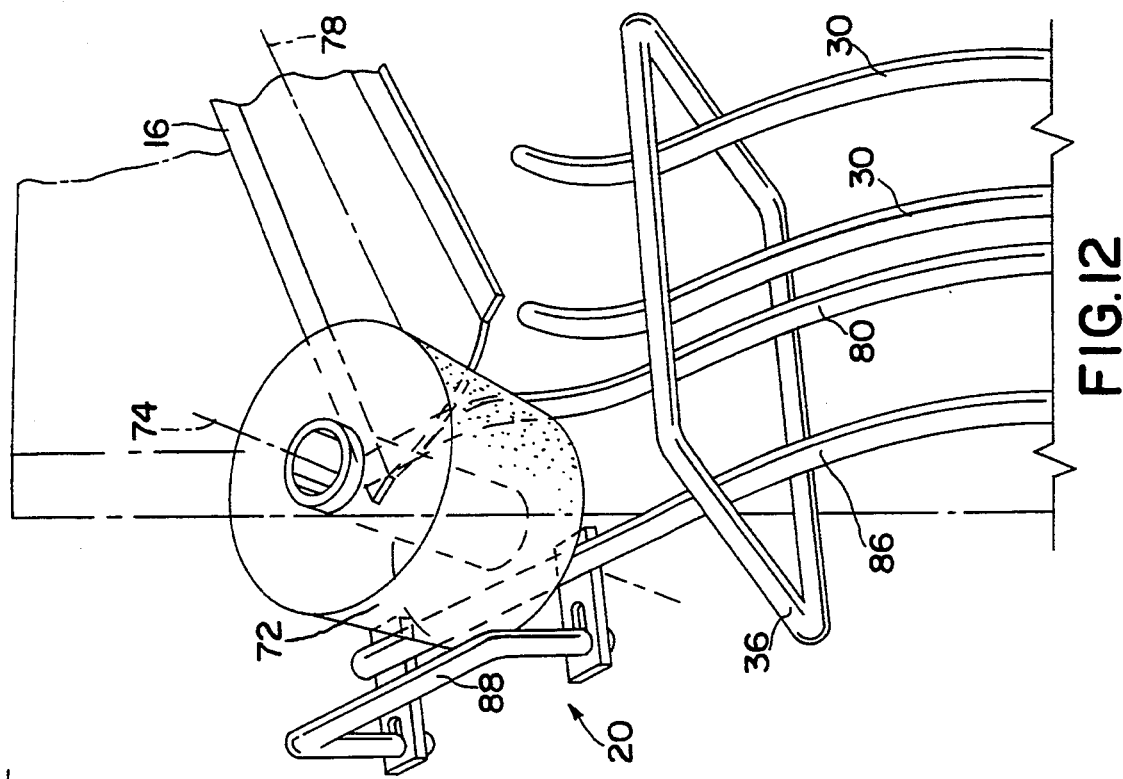
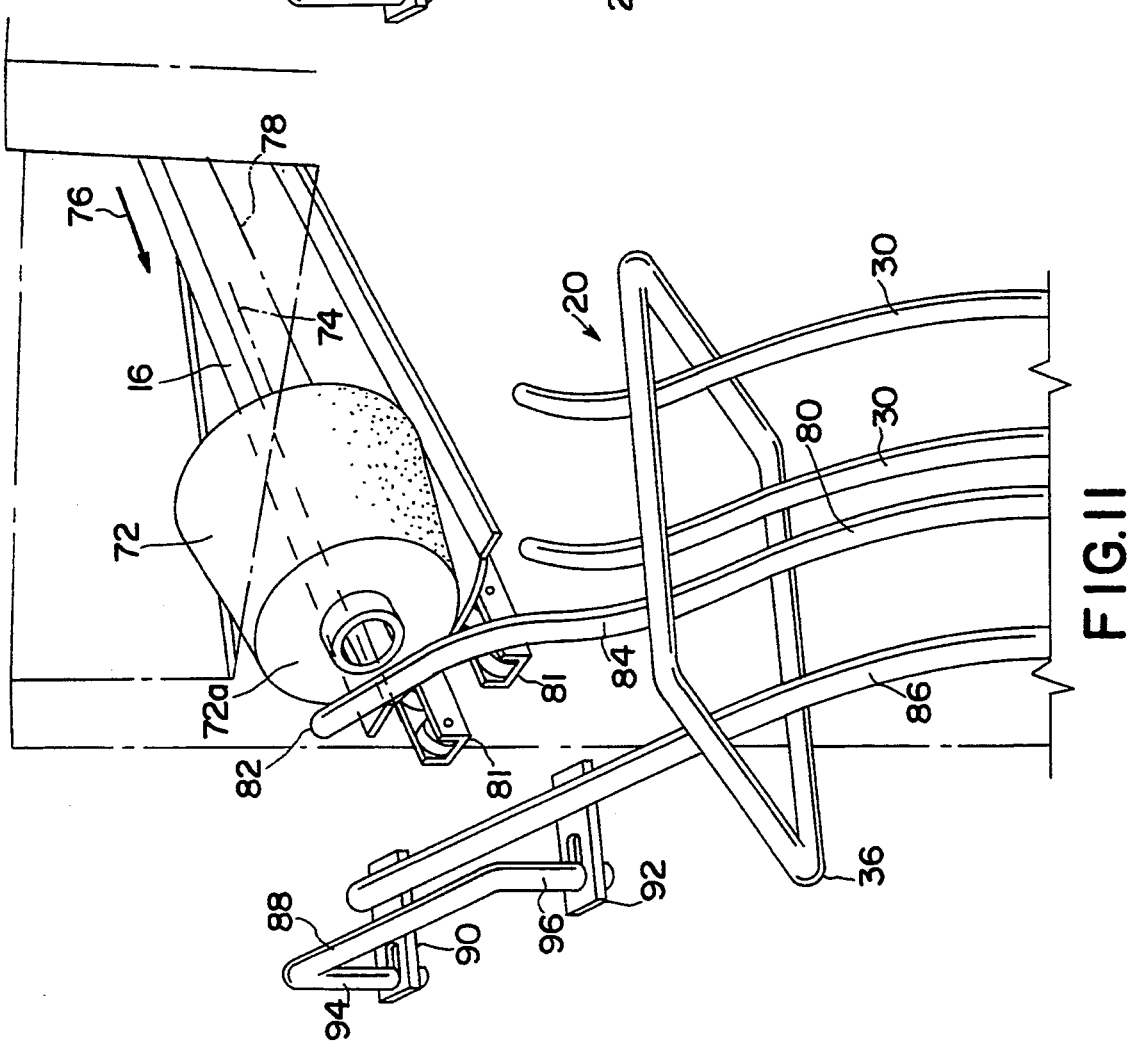

PACKAGE TRANSPORT SYSTEM AND METHOD

BACKGROUND OF THE INVENTION

This invention relates to a system for transporting yarn packages from a textile machine, such as an open-end spinning machine, onto a transport conveyor such that the packages fall by gravity thereon without making contact with each other and are uniformly spaced on the transport conveyor at a predetermined distance from one another.

Various systems for transporting yarn packages are known in the art. Endless conveyor belts, such as those disclosed in U.S. Pat. No. 4,118,920 are a common means for transporting yarn packages from a textile machine to a subsequent station, such as a container. U.S. Pat. No. 3,906,712 teaches a means for correcting orientation of yarn packages after they have already been placed onto a conveyor belt. Other types of transporting systems include a package gripper with expanding means, such as that disclosed in U.S. Pat. No. 5,062,261, and the overhead automated conveying system disclosed in U.S. Pat. No. 4,979,360.

While the foregoing transporting systems may be deemed suitable for their respective intended purposes, none of these systems teach any means for transporting packages from a machine onto a conveyor, let alone a means which would uniformly space yarn packages from one another along the conveyor. Furthermore, all of these systems utilize complex automated machinery, comprised of a large number of moving components. Consequently, such machinery is expensive to operate and maintain and is subject to an increased risk of failure.

SUMMARY OF THE INVENTION

It is an important object of the present invention to provide a package transport system which consistently deposits packages onto a conveyor at a uniform distance from one another.

It is a further object of the present invention to provide a package transport system which allows the packages to fall by gravity onto a conveyor.

It is a further object of the present invention to provide a package transport system which eliminates the need for moving parts.

It is a further object of the present invention to provide a package transport system which changes the orientation of the packages before they descend to a conveyor.

These as well as other objects are accomplished by a package transport system comprising a first output conveyor leading outwardly from a top portion of a textile machine, a second output conveyor leading outwardly from the top portion of the textile machine adjacent the first output conveyor, a first chute communicating with the first output conveyor for transporting a first package from an end of the first output conveyor to a transport conveyor, and a second chute communicating with the second output conveyor for transporting a second package from an end of the second output conveyor to the transport conveyor. Thus, the first and second packages are deposited onto the transport conveyor at a predetermined distance from one another without making contact.

BRIEF DESCRIPTION OF THE DRAWINGS

FIG. 7 is a side elevation view of a package transport system constructed in accordance with the preferred embodiment of the present invention, illustrating the profiles of the chutes in their entirety;

FIG. 8 is a sectional elevation view of a chute taken along line 8—8 in FIG. 7, showing a yarn package in phantom lines seated therein;

FIG. 11 is a perspective view of a yarn package moving off a second output conveyor of a textile machine just before it reaches a second chute of the package transport system, and FIG. 12 is a perspective view similar to FIG. 11, except that it shows the package illustrated therein as having just been placed on the second chute of the package transport system.

DETAILED DESCRIPTION

The drawings illustrate a package transport system 1 communicating with a textile machine 2, preferably an open-end spinning machine, and with a transport conveyor 4. The system 1 deposits yarn packages onto the transport conveyor 4 at a predetermined distance from one another, such that the yarn packages do not contact each other during any point as they are transferred to and from the system 1.

Figure 1:
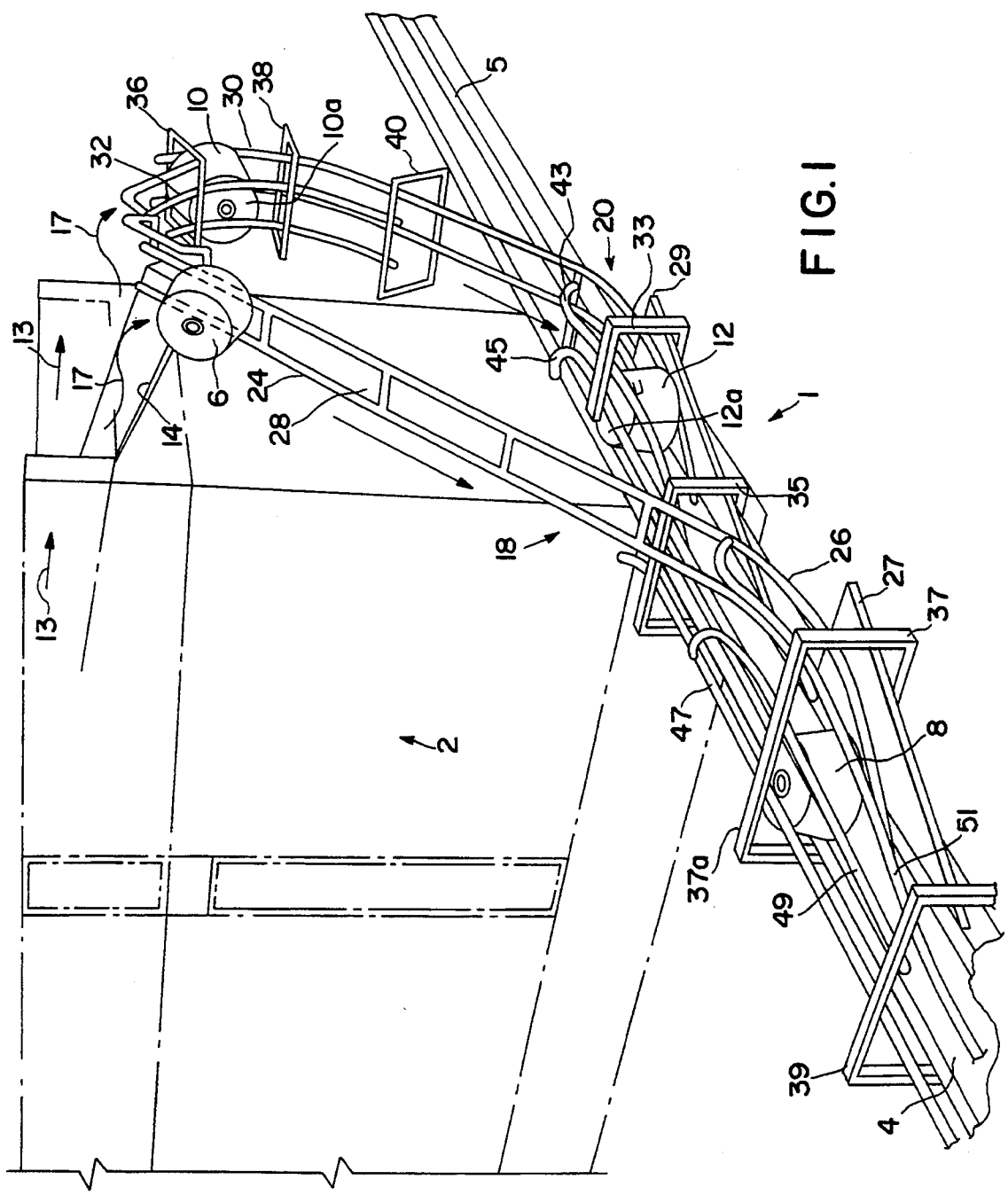
FIG. 1 is a perspective view of the operation of a package transport system constructed in accordance with a preferred embodiment of the present invention.
Figure 2:
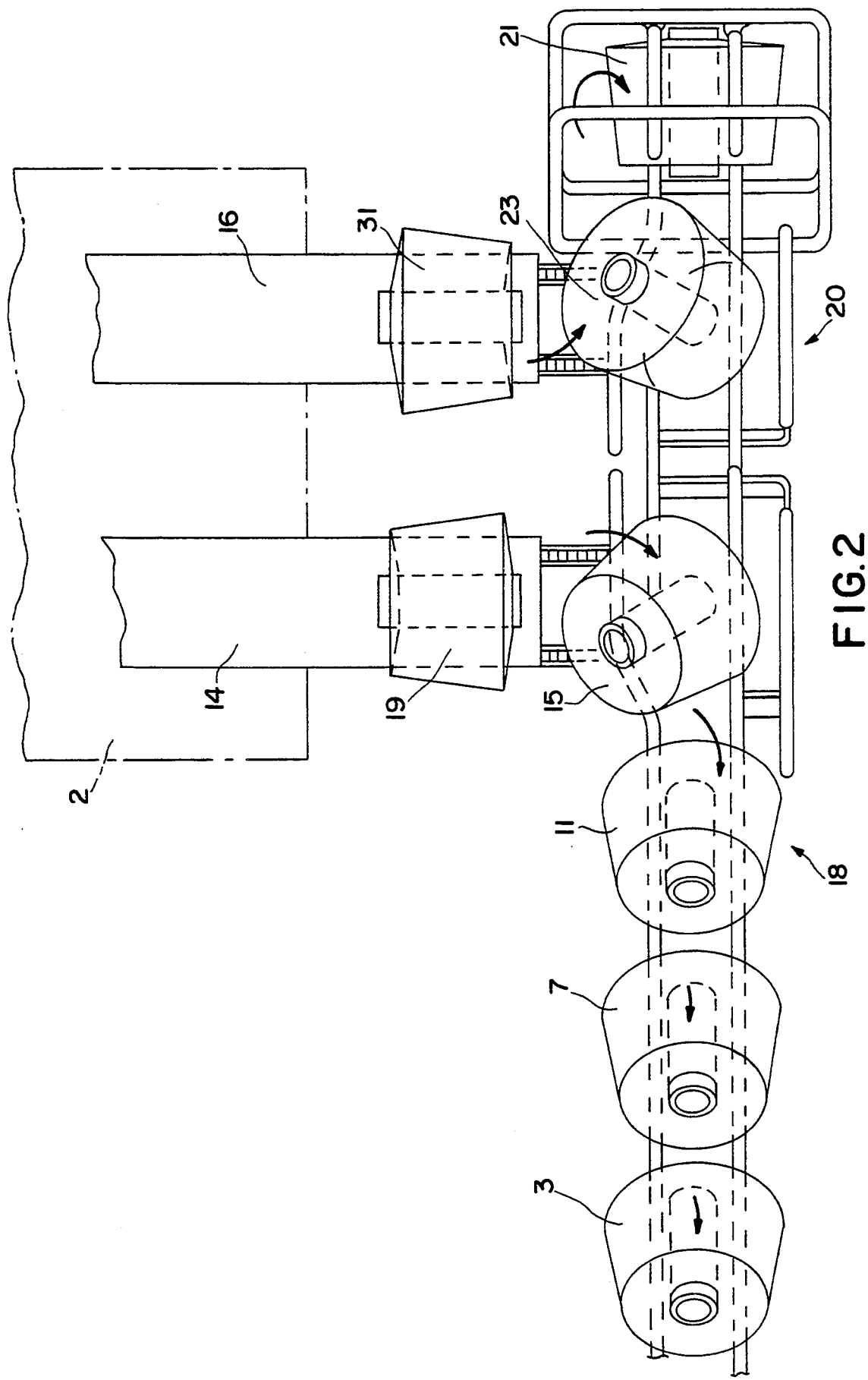
FIG. 2 is a plan view of the package transport system illustrated in FIG. 1, showing packages traveling down output conveyors of a textile machine and showing additional packages traveling down first and second chutes of the system.

Referring to FIG. 1, a conventional open-end spinning machine 2 spins carded sliver into finished yarn packages 6, 8, 10, and 12, whereupon they are conveyed from a top portion of machine 2 in the direction of arrows 13 via first and second output conveyors 14 and 16, respectively (see FIG. 2). Upon reaching the end of the output conveyors 14 and 16, the packages are transferred to the transport system 1, as shown by arrows 17, whereupon they fall by gravity through first and second chutes 18 and 20, respectively, onto the transport conveyor 4 such that no two packages contact one another from the time of their production to the time they are deposited on the transport conveyor 4.

The first chute 18 communicates with the first output conveyor 14 and is attached thereto preferably with fastening means such as a mounting bracket 22 (FIG. 7) and one or more threaded fasteners (not shown). The first chute 18 is preferably configured as a rail, comprised of a pair of shaped tubular longitudinal members 24, 26 joined by a plurality of transverse members such as at 28. A first wedge-shaped mounting plate 27 interconnects the lower ends of the members 24 and 26 to a frame 5 of the transport conveyor 4.

The second chute 20 communicates with the second output conveyor 16; however, unlike first chute 18, second chute 20 is comprised of a pair of rails 30 and 32 for a predetermined length. These rails confine the top and bottom faces of a package such as at 10, ensuring that it descends along the path defined by the rails. When package 10 is first placed onto the second chute 20, it rests upon rail 32; however, its weight is transferred to rail 30 at a point along its path of travel. Consequently, once it is deposited onto the transport conveyor 4, face 10a of package 10 points upwardly in the same manner as face 12a of package 12. Due to this upturning of faces, positions of packages traveling down the second output conveyor 16 are rotated 180° from those of packages traveling down the first output conveyor 14 (see FIG. 2, packages 19 & 31) so that all transported packages have the same orientation on the transport conveyor 4, i.e., their lower faces have a greater diameter than the faces pointing upwardly.

Rail 32 is attached to the second output conveyor 16 in the same manner as is first chute 18 to the first output conveyor 14; i.e., preferably with a mounting bracket 34 (FIG. 7). As with the lower end of the first chute 18, the lower ends of second chute 20, or more particularly the rail 30, are interconnected to the transport conveyor 4 frame 5 through a second wedge-shaped mounting plate 29.

Rails 30 and 32, as well as the rail comprising the first chute 18, are preferably constructed of stainless steel tubing. Rail 32, spaced equidistantly from rail 30 along its entire length, is interconnected to rail 30 by way of a plurality of retaining rings 36, 38, and 40 which are preferably attached to rails 30 and 32 by welds, although other fastening means are contemplated as being within the scope of the present invention.

The ring-rail connection in the preferred embodiment is best seen in FIG. 8. A package traveling down second chute 20 is shown in phantom lines at 41.

FIG. 1 additionally shows a means for retaining packages 8 and 12 on the transport conveyor 4 once they leave first chute 18 and second chute 20, respectively. In the preferred embodiment, this means is a retaining rail assembly elevated above transport conveyor 4. This retaining rail assembly includes a first bracket 33 mounted to frame 5 proximate a terminus of second chute 20, a second bracket 35 mounted to frame 5 and longitudinally spaced from first bracket 33, a third bracket 37 mounted to frame 5 and longitudinally spaced from second bracket 35, and a fourth bracket 39 mounted to frame 5 and longitudinally spaced from third bracket 37. Each of these brackets are preferably oriented transversely to the transport conveyor 4. A first retaining extension 43 originates proximate first bracket 33 and terminates at fourth bracket 39; a second retaining extension 45 originates proximate first bracket 33 and terminates at second bracket 35; a third retaining extension 47 originates proximate second bracket 35 and extends beyond fourth bracket 39; a fourth retaining extension 49 originates proximate third bracket 37 and terminates at fourth bracket 39, and a fifth retaining extension 51 originates proximate third bracket 37 and extends beyond fourth bracket 39. Retaining extensions 43, 45, 47, 49, and 51 are preferably constructed of tubular members of the type used in longitudinal members 26 and 28 of first chute 18. Each of these extensions are connected to an interior face of an upper leg, such as at 37a, of associated brackets.

While the aforementioned structure for retaining packages 8 and 12 on the transport conveyor 4 is the preferred means, equivalent structures are contemplated as being within the scope of the present invention. For instance, instead of supporting tubular members, brackets mounted to frame 5 may support flat plates to retain packages on the transport conveyor 4.

Referring to FIGS. 2–6, packages 3, 7, 11, 15, and 19 are shown descending down first output conveyor 14 and first chute 18, while packages 21, 23, and 31 are shown descending down second output conveyor 16 and second chute 20. Package 15, shown in transition between the first output conveyor 14 and the first chute 18, assumes an intermediate position whereby it is rotating away from the spinning machine 2 about the point where the package 15 contacts member 24 of first chute 18 (see FIG. 5). Package 23 likewise undergoes such motion with respect to member 80 of second chute 20 (see FIG. 6). Once packages on the first chute complete the aforementioned transition, they assume the position shown at FIG. 4, where a central longitudinal axis 7a of a package 7 is normal to a plane P containing members 24 and 26.

FIG. 7 illustrates the profile of the package transport system 1. Although the rails comprising the chutes 18, 20 are preferably unitary, the profile of each of them includes several distinct geometric portions. Specifically, the profile of first chute 18 is defined by a first straight portion 42 inclined at an angle with respect to the transport conveyor 4, a second straight portion 44 substantially parallel to the transport conveyor 4, and an arcuate portion 46 joining portions 42 and 44. The profile of the rail 30 of second chute 20 is defined by a first arcuate portion 48, a second arcuate portion 50, a first straight portion 52 joining portions 48 and 50 and inclined at an angle with respect to the transport conveyor 4, and a second straight portion 54 extending from the second arcuate portion 50 in substantially parallel relation to the transport conveyor 4. The profile of rail 32 of second chute 20 is defined by a straight portion 55, which is inclined at angle to the transport conveyor 4 and which is approximately 90° to the first straight portion 42 of first chute 18, and an arcuate portion 57. The following dimensions of each portion of first chute 18 and of second chute 20 (rails 30 and 32) have been found to provide optimum uniformity in package transport:

| Portion | | Parameter | Dimension |
| --- | --- | --- | --- |
| First chute 18 | | | |
| | first straight portion 42 | length | 1636 in. |
| | second straight portion 44 | length | 630 in. |
| | arcuate portion 46 | radius subtending angle | 600 in. 45° |
| Rail 30 | | | |
| | first arcuate portion 48 | radius subtending angle | 450 in. 90° |

| | Portion | Parameter | Dimension |
|---|---|---|---|
| | second arcuate portion 50 | radius | 600 in. |
| | | subtending angle | 45° |
| | first straight portion 52 | length | 364 in. |
| | second straight portion 54 | length | 630 in. |
| Rail 32 | | | |
| | straight portion 55 | length | 220.5 in. |
| | arcuate portion 57 | radius | 600 in. |
| | | subtending angle | 45° |

Figure 10:
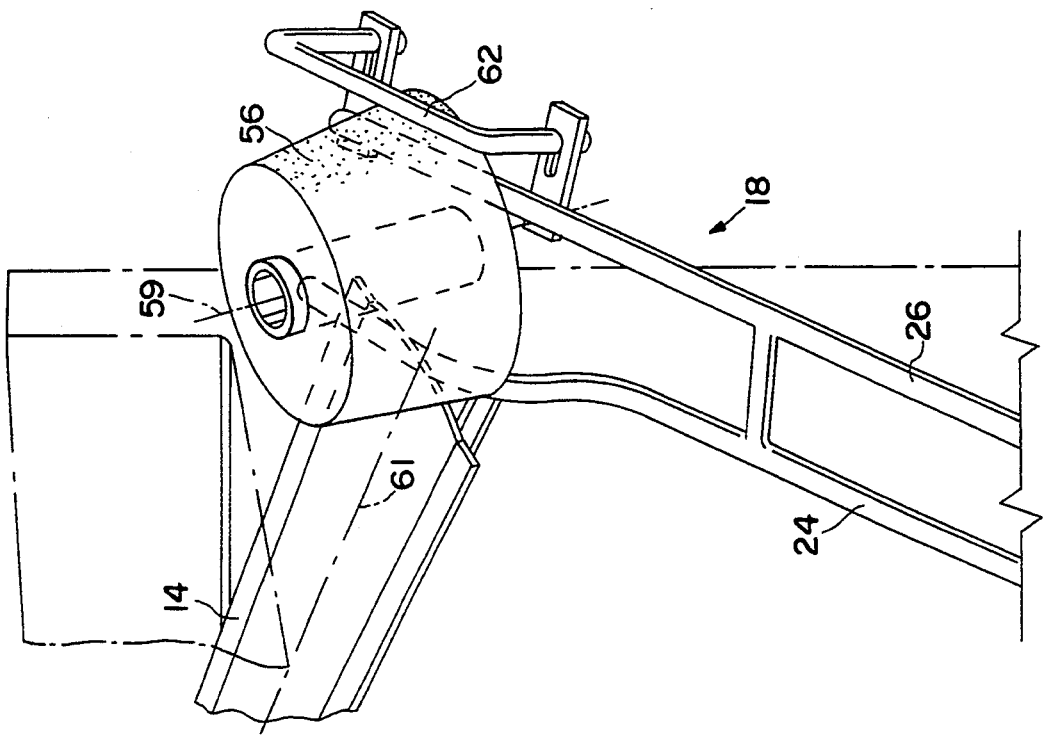
FIG. 10 is a perspective view similar to FIG. 9, except that it shows the package illustrated therein as having just been placed on the first chute of the package transport system.
Figure 9:
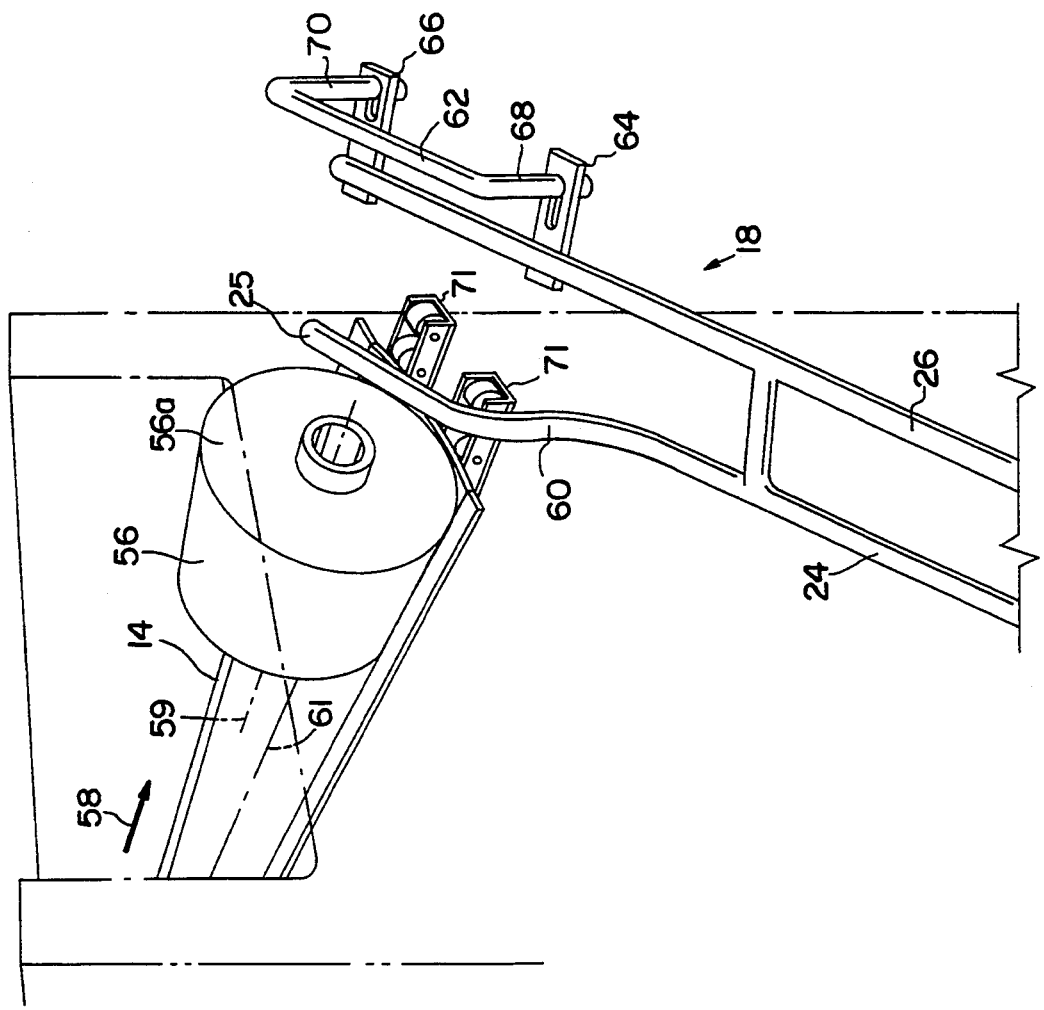
FIG. 9 is a perspective view of a yarn package moving off a first output conveyor of a textile machine just before it reaches a first chute of the package transport system.

FIGS. 9 and 10 illustrate the cause of the change in orientation a yarn package undergoes in moving from the first output conveyor 14 onto the first chute 18.

In FIG. 9, a first package 56 having a central longitudinal axis 59 moves toward the end of the first output conveyor 14 in the direction shown by arrow 58. During this motion, axis 59 is substantially parallel to a longitudinal axis 61 of the first output conveyor 14. As front face 56a of package 56 passes the end of the first output conveyor 14, the package 56 travels over a pair of roller assemblies 71 hingedly mounted to the front output conveyor 14. Travel of the package 56 in the direction of arrow 58 halts when front face 56a contacts member 24 of chute 18 at a terminal portion 25 of the member 24, which may be flared outwardly from the remainder of member 24 through a flared portion 60. As shown in FIG. 9, a retaining bar 62 is mounted alongside member 26 of first chute 18 to ensure that the package 56 does not fall from the first chute 18 upon transfer thereto. Mounting means for the retaining bar 62 comprises transverse plates 64, 66 welded to member 26 and accommodating lower ends of vertical sections 68, 70 of retaining bar 62 in slots 63, 65 formed within the plates 64, 66, respectively. This slotted attachment permits either or both ends of the retaining bar 62 to be moved toward or away from member 26, depending upon the size or configuration of the yarn package leaving the first output conveyor 14.

Referring to FIG. 10, first package 56 has undergone a change in its orientation upon having been transferred to first chute 18. Axis 59 is now substantially perpendicular to the first straight portion 42 (FIG. 7) of first chute 18. Thus, package 56 has rotated approximately 90° from its position on the first output conveyor 14.

FIGS. 11 and 12 illustrate the cause of a similar change in orientation undergone by a package moving from the second output conveyor 16 onto the second chute 20.

In FIG. 11, a second package 72 having a central longitudinal axis 74 moves toward the end of the second output conveyor 16 in the direction shown by arrow 76. During this motion, axis 74 is substantially parallel to a longitudinal axis 78 of the second output conveyor 16. As front face 72a of package 72 passes the end of the second output conveyor 16, the package 72 travels over a pair of roller assemblies 81 hingedly mounted to the second output conveyor 16. Motion in the direction of arrow 76 ceases when front face 72a of package 72 contacts a member 80 of rail 32 at a terminal portion 82 of the member 80. In a manner similar to terminal portion 25 of member 24 of the first chute 18, terminal portion 82 may be flared outwardly from the remainder of member 80 through a flared portion 84. Additionally, a member 86 of rail 32 may be provided with a retaining bar 88 disposed alongside it by means of transverse plates 90, 92 providing slotted mountings for the retaining bar 88 in the same manner as described with respect to retaining bar 62, namely, the ends of vertical portions 94, 96 of retaining bar 88 are journaled in slots within the transverse plates 90 and 92.

Referring to FIG. 12, second package 74 has undergone a change in its orientation upon having been transferred to rail 32 of second chute 20. Axis 59 is now substantially perpendicular to the straight portion 55 (FIG. 7) of second chute 20. Second package 74 has therefore rotated approximately 90° from its position on the second output conveyor 16.

Figure 3:
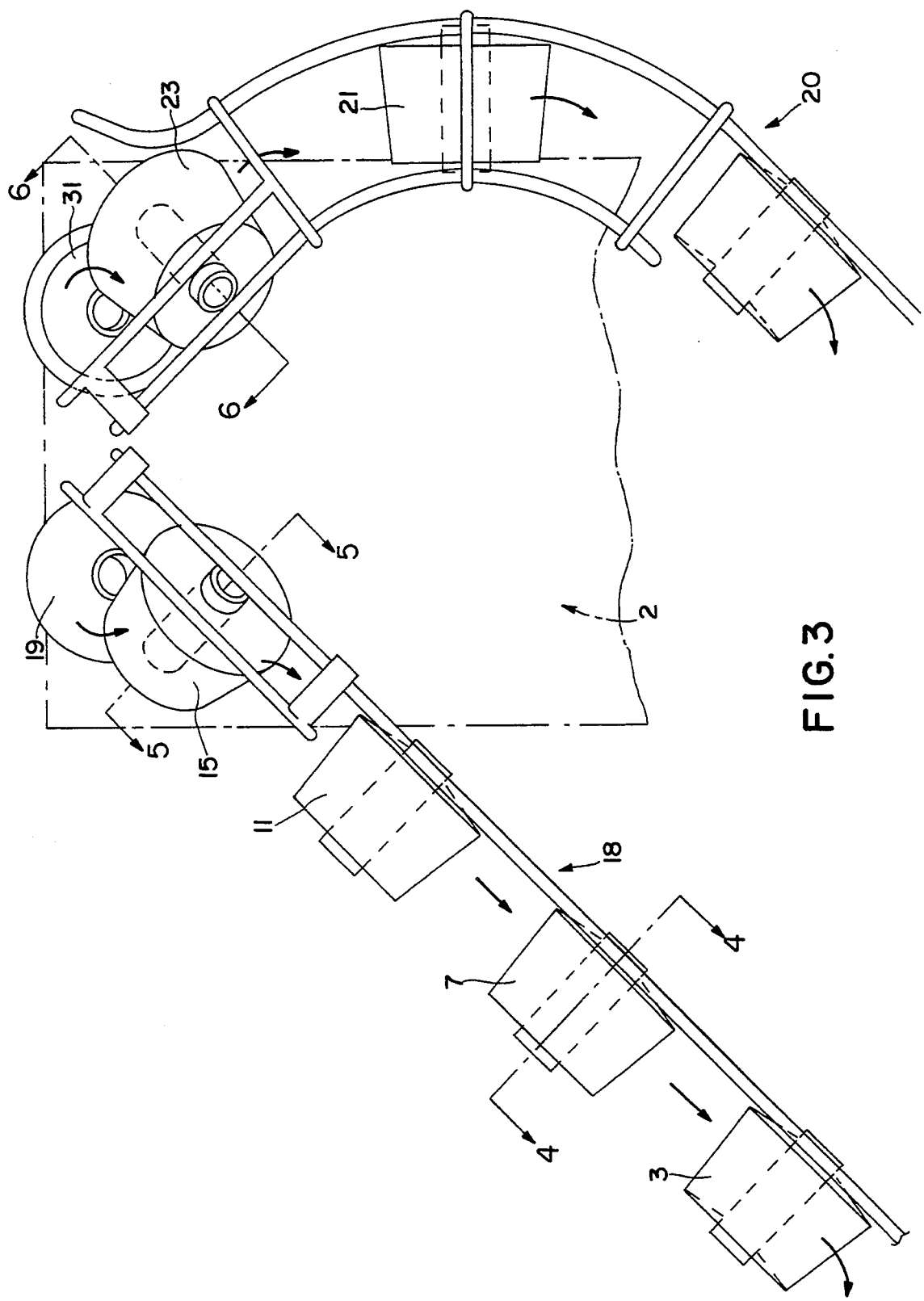
FIG. 3 is a side elevation view of the package transport system illustrated in FIG. 2, showing, among other things, intermediate orientation of yarn packages as they undergo transition from the output conveyors to the chutes.
Figure 6:
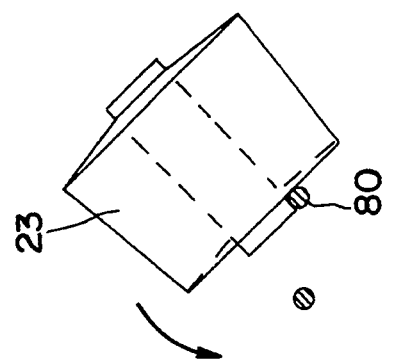
FIG. 6 is a sectional elevation view taken along line 6—6 of FIG. 3.
Figure 5:
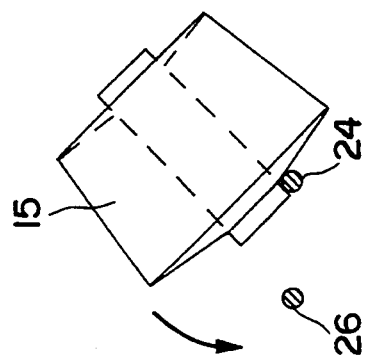
FIG. 5 is a sectional elevation view taken along line 5—5 of FIG. 3.
Figure 4:
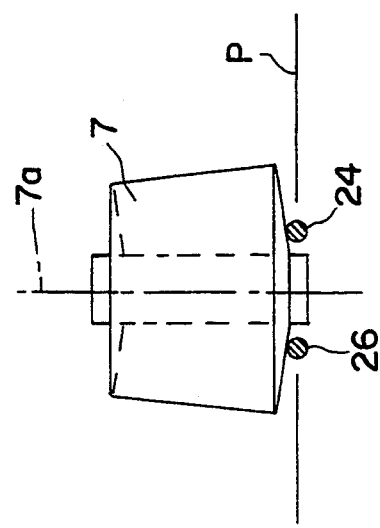
FIG. 4 is a sectional elevation view taken along line 4—4 of FIG. 3.

As second package 72 travels down the second chute 20, axis 74 becomes parallel to the transport conveyor 4 at a point where axis 74 and the profile of retaining ring 38 coincide, since retaining ring 38 lies in a plane which is parallel to the transport conveyor 4 (see, for example, package 21 in FIG. 3).

It is thus seen that a system for transporting yarn packages from a textile machine to a transport conveyor may be provided which permits the yarn packages to fall by gravity onto the transport conveyor at a uniform distance from one another such that the yarn packages do not contact one another.

As the above description is merely exemplary in nature, being merely illustrative of the invention, many variations will become apparent to those of skill in the art. Such variations, however, are included within the spirit and scope of this invention as defined by the following appended claims.

That which is claimed:

1. A system for transporting yarn packages from a textile machine having first and second output conveyors to a transport conveyor supported by a frame, comprising:

a first chute communicating with said first output conveyor for transporting a first package from an end of said first output conveyor to said transport conveyor; and a second chute communicating with said second output conveyor for transporting a second package from an end of said second output conveyor to said transport conveyor;

whereby said first and second packages are uniformly deposited onto said transport conveyor at a predetermined distance from one another and wherein the movement of said first and second packages are unencumbered by stops.

2. The system set forth in claim 1 wherein said first and second packages respectively travel down said first and second chutes through gravitational force.

3. The system set forth in claim 1 wherein a central longitudinal axis of said first package during transition thereof from said first output conveyor to said first chute changes orientation from a position substantially parallel to said first output conveyor to a position substantially normal to a straight portion of said first chute.

4. The system set forth in claim i wherein a central longitudinal axis of said second package during transition thereof from said second output conveyor to said second chute changes orientation from a position substantially parallel to said second output conveyor to a position substantially normal to a straight portion of said second chute.

5. The system set forth in claim 1 wherein a profile of said first chute is defined by a first portion inclined at an angle with respect to said transport conveyor, a second portion substantially parallel to said transport conveyor, and an arcuate portion joining said first and second portions.

6. The system set forth in claim 1 wherein a profile of said second chute is defined by a first arcuate portion, a second arcuate portion, a first straight portion inclined at an angle with respect to said transport conveyor and joining said first and second arcuate portions, and a second straight portion extending from said second arcuate portion in substantially parallel relation to said transport conveyor.

7. The system set forth in claim 1 further comprising means for confining top and bottom faces of said second package along a predetermined length of said second chute.

8. The system set forth in claim 7 wherein said first chute is constructed of a first rail attached to said end of said first output conveyor and said second chute includes a second rail.

9. The system set forth in claim 8 further comprising:
a third rail of a predetermined length attached to said end of said second output conveyor spaced equidistantly from said second rail along said length;
whereby said second package travels on said third rail before traveling on said second rail.

10. The system set forth in claim 9 further comprising a retaining ring interconnecting said third rail and said second rail.

11. The system set forth in claim 9 wherein a profile of said third rail is defined by a straight portion inclined at an angle with respect to said transport conveyor and an arcuate portion.

12. The system set forth in claim 11 wherein said straight portion of said third rail is substantially perpendicular to a first straight portion of said first chute.

13. The system set forth in claim 1 further comprising means for retaining said first and second packages on said transport conveyor once said first and second packages leave said first and second chutes.

14. The system set forth in claim 13 wherein said means is a retaining rail assembly elevated above said transport conveyor.

15. The system set forth in claim 1 further comprising:
a first wedge-shaped plate mounted to said frame of said transport conveyor interconnecting said first chute to said frame; and
a second wedge-shaped plate mounted to said frame of said transport conveyor interconnecting said second chute to said frame.

16. The system according to claim 1, wherein said first and second packages have the same orientation when they are on the first and second output conveyors respectively.

17. The system according to claim 1, wherein said first and second packages are simultaneously transported to said first and second chutes, respectively.

18. A system for transporting yarn packages from a textile machine having first and second output conveyors to a transport conveyor supported by a frame, comprising:
a first chute communicating with said first output conveyor for transporting a first package from an end of said first output conveyor to said transport conveyor; and
a second chute communicating with said second output conveyor for transporting a second package from an end of said second output conveyor to said transport conveyor;
whereby said first and second packages are deposited onto said transport conveyor at a predetermined distance from one another without making contact with one another; and
further comprising means for retaining said first and second packages on said transport conveyor once said first and second packages leave said first and second chutes, wherein said means is a retaining rail assembly, elevated above said transport conveyor, and comprising:
a first bracket mounted to said frame of said transport conveyor proximate a terminus of said second chute;
a second bracket mounted to said frame and longitudinally spaced from said first bracket;
a third bracket mounted to said frame and longitudinally spaced from said second bracket;
a fourth bracket mounted to said frame and longitudinally spaced from said third bracket;
a first retaining extension originating proximate said first bracket and terminating at said fourth bracket;
a second retaining extension originating proximate said first bracket and terminating at said second bracket;
a third retaining extension originating proximate said second bracket and extending beyond said fourth bracket;
a fourth retaining extension originating proximate said third bracket and terminating at said fourth bracket; and
a fifth retaining extension originating proximate said third bracket and extending beyond said fourth bracket.

19. A method of transporting yarn packages from a textile machine to a transport conveyor, comprising the steps of:
providing a first output conveyor leading outwardly from a top portion of said textile machine;
providing a second output conveyor adjacent said first output conveyor leading outwardly from said top portion of said textile machine;
providing a first chute communicating with said first output conveyor for transporting a first package from an end of said first output conveyor to said transport conveyor;
providing a second chute communicating with said second output conveyor for transporting a second package from an end of said second output conveyor to said transport conveyor; and
causing said first and second packages to travel respectively along said first and second chutes such that said packages are uniformly deposited onto said transport conveyor at a predetermined distance from one another and wherein the movement of said first and second packages are unencumbered by stops.

20. The method set forth in claim 19 wherein said first and second packages respectively travel down said first and second chutes through gravitational force.

21. The method set forth in claim 19 comprising the further step of changing orientation of a central longitudinal axis of said first package during transition thereof from said first output conveyor to said first chute from a position substantially parallel to said first output conveyor to a position substantially normal to a straight portion of said first chute.

22. The method set forth in claim 19 comprising the further step of changing orientation of a central longitudinal axis of said second package during transition thereof from said second output conveyor to said second chute from a position substantially parallel to said second output conveyor to a position substantially normal to a straight portion of said second chute, 23. The method set forth in claim 19 comprising the further step of confining top and bottom faces of said second package along a predetermined length of said second chute, 24. The method set forth in claim 19 comprising the further step of causing a central longitudinal axis of said second package to be oriented parallel to said transport conveyor when said second package reaches a point along said second chute.

25. method according to claim 19, wherein said first and second packages are provided with the same orientation when they are on the first and second output conveyors, respectively.

26. The method according to claim 19, wherein said first and second packages are simultaneously transported to said first and second chutes, respectively.

* * * * *